(12) United States Patent
I

(10) Patent No.: US 6,784,897 B2
(45) Date of Patent: Aug. 31, 2004

(54) APPARATUS FOR CARRYING OUT TRANSLUCENT-PROCESSING TO STILL AND MOVING PICTURES AND METHOD OF DOING THE SAME

(75) Inventor: Hiroaki I, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 192 days.

(21) Appl. No.: 10/010,836

(22) Filed: Dec. 5, 2001

(65) Prior Publication Data

US 2002/0067418 A1 Jun. 6, 2002

(30) Foreign Application Priority Data

Dec. 5, 2000 (JP) ........................................ 2000-370604

(51) Int. Cl.$^7$ ................................................ G09G 5/02
(52) U.S. Cl. ...................... 345/592; 345/597; 345/638; 345/593; 345/629
(58) Field of Search ................................ 345/597, 638, 345/592, 593, 629

(56) References Cited

U.S. PATENT DOCUMENTS 6,016,150 A 1/2000 Lengyel et al.
6,146,277 A * 11/2000 Ikeda ........................... 463/43

FOREIGN PATENT DOCUMENTS

| JP | 5-228246 | 9/1993 |
| JP | 11-505644 | 5/1999 |
| JP | 3049012 | 3/2000 |

* cited by examiner

Primary Examiner—Matthew C. Bella
Assistant Examiner—Tam Tran
(74) Attorney, Agent, or Firm—Scully, Scott, Murphy & Presser (57) ABSTRACT

An apparatus for carrying out translucent-processing to still and moving pictures, includes (a) a judgment unit which judges whether a picture to be displayed is a still or moving picture, (b) a memory which stores first data about first and second pictures to be processed, and second data indicative of a ratio at which pixels of the first and second pictures are blended, (c) a still picture processor which blends color-relating values of the pixels in a portion at which the first and second pictures overlap each other, at the ratio, for producing third data relating to a translucent picture, and stores the thus produced third data in the memory, and (d) a moving picture processor which blends color-relating values of the pixels in a portion at which the first and second pictures overlap each other, at the ratio, for producing fourth data relating to a translucent picture.

15 Claims, 7 Drawing Sheets

FIG.6 α-BLENDING TO STILL PICTURE

FIG.7

APPARATUS FOR CARRYING OUT TRANSLUCENT-PROCESSING TO STILL AND MOVING PICTURES AND METHOD OF DOING THE SAME

BACKGROUND OF THE INVENTION

1. Field of the Invention

The invention relates to an apparatus for and a method of carrying out translucent-processing to both still and moving pictures.

2. Description of the Related Art

In $\alpha$-blending or translucent-processing in graphics, color-relating values in pixel data of two pictures are blended at a ratio of $\alpha$: $(1-\alpha)$. The $\alpha$-blending causes reduction in both the number and size of planes to be transferred to such a degree necessary for reading a $\alpha$-value out of a frame buffer, in comparison with not carrying out $\alpha$-blending.

In these days, data in displayed pictures is likely to increase more and more, and hence, the reduction in data of displayed picture, caused by carrying out $\alpha$-blending, becomes a major problem.

Accordingly, the reduction in data of displayed picture, caused by carrying out $\alpha$-blending, is required to eliminate.

A circuit for carrying out $\alpha$-blending process is suggested in Japanese Patent No. 3049012 (Japanese Unexamined Patent Publication No. 2000-020049). In the suggested circuit, two data about pictures are $\alpha$-blended.

Figure 1:
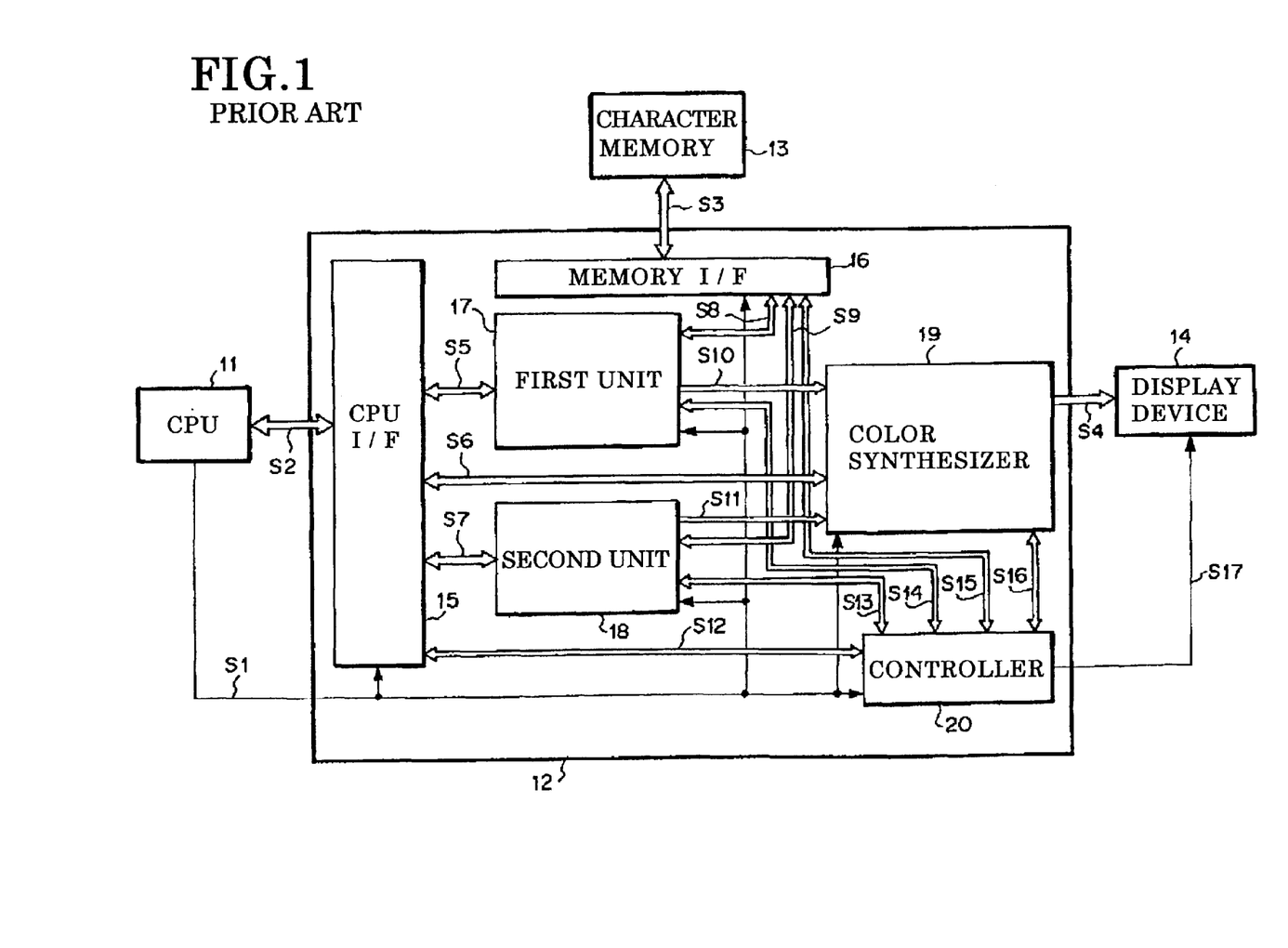
FIG. 1 is a block diagram of a conventional circuit for carrying out α-blending process.

FIG. 1 is a block diagram of the circuit suggested in the Japanese Patent. The circuit for carrying out $\alpha$-blending process is comprised of a central processing unit (CPU) 11, a two-dimensional graphics processor 12, a character memory 13, and a display device 14.

The two-dimensional graphics processor 12 is comprised of a CPU interface 15 receiving a signal S2 from and transmitting a signal S2 to the central processing unit 11, a memory interface 16 receiving a signal S3 from and transmitting a signal S3 to the memory 13, a first unit 17 for displaying a background, receiving a signal S5 from and transmitting a signal S5 to the central processing unit 11, and receiving a signal S8 from and transmitting a signal S8 to the memory interface 15, a second unit 18 for displaying a graphics, receiving a signal S7 from and transmitting a signal S7 to the central processing unit 11, and receiving a signal S9 from and transmitting a signal S9 to the memory interface 15, a color synthesizer 19 receiving a signal S6 from and transmitting a signal S6 to the central processing unit 11, receiving signals S10 and S11 from the first and second units 17 and 18, respectively, and transmitting a signal S4 to the display device 14, and a controller 20 for controlling operations of the CPU interface 15, the memory interface 16, the first unit 17, the second unit 18 and the color synthesizer 19 through signals S12, S15, S14, S13 and S16, respectively.

The central processing unit 11 transmits a control signal S1 to the CPU interface 15, the memory interface 16, the first unit 17, the second unit 18, the color synthesizer 19 and the controller 20 for controlling operations of them. The controller 20 transmits a control signal S17 to the display device 14 for controlling operation of the display device 14.

The memory 13 is comprised of a read only memory (ROM).

Figure 2:
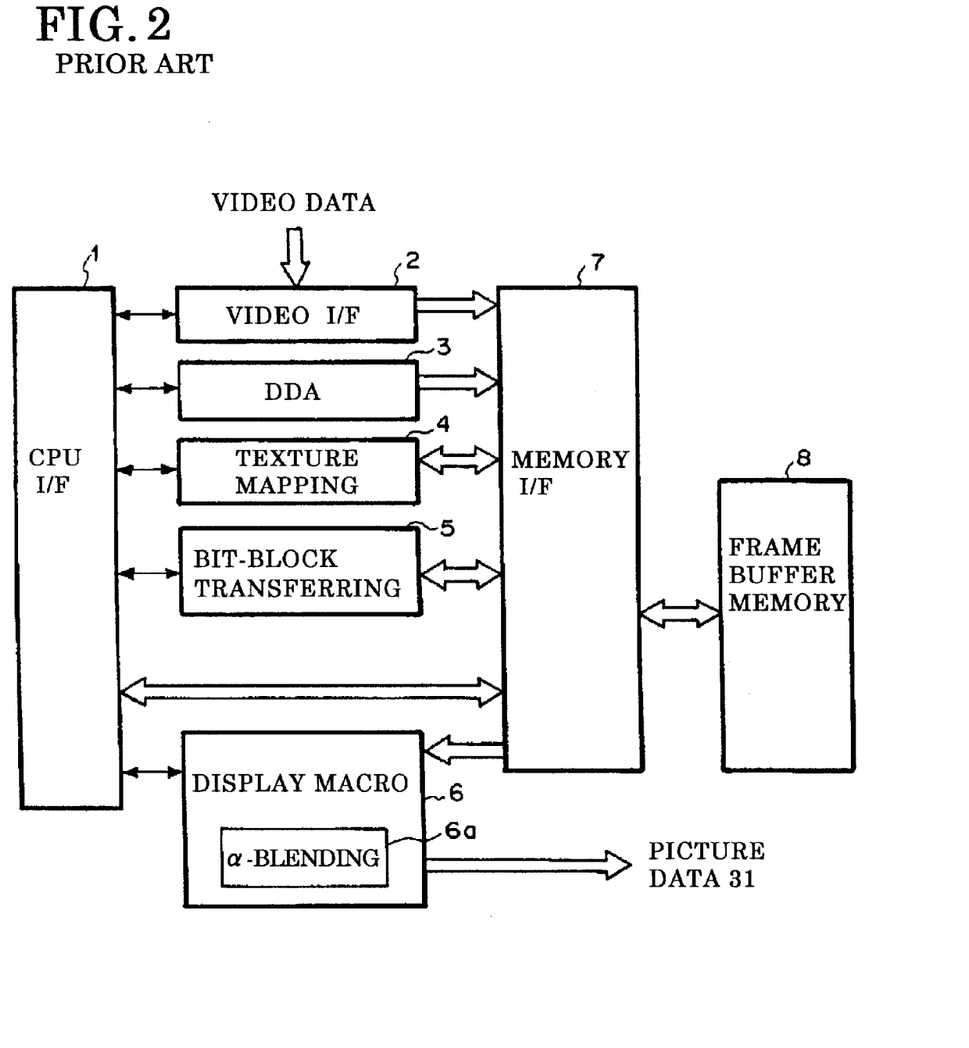
FIG. 2 is a block diagram of an apparatus obtained by generalizing the circuit illustrated in FIG. 1.

FIG. 2 is a block diagram of an apparatus obtained by generalizing the circuit illustrated in FIG. 1.

The apparatus illustrated in FIG. 2 is comprised of a central processing unit interface 1 to which picture data and first data indicative of a ratio at which two data is $\alpha$-blended are input, a video interface 2 to which video data is input, a frame buffer memory 8 storing the above-mentioned picture data and first data therein, a memory interface 7 acting as an interface for the frame buffer memory 8, a graphic macro circuit, and a display macro circuit 6 which controls pictures to be displayed, and includes a circuit 6a for carrying out $\alpha$-blending.

The graphic macro circuit is comprised of a digital differential analysis (DDA) circuit 3, a texture mapping circuit 4, and a circuit 5 for transferring a bit block.

The above-mentioned apparatus illustrated in FIG. 2 is accompanied with a problem that when data about pictures to be displayed is to be $\alpha$-blended, it is necessary to read both two picture data to be $\alpha$-blended and the first data indicative of a ratio at which the two picture data is $\alpha$-blended, out of the frame buffer memory 8 for both still and moving pictures each time a picture to be displayed is changed.

As a result, the picture data indicating a picture to be displayed has to be reduced in size to such a degree necessary for reading the first data out of the frame buffer memory 8, because of a limit in time for making access to the frame buffer memory 8.

Japanese Unexamined Patent Publication No. 5-228246 has suggested a pachinko machine including a display unit formed on a playing board for electronically displaying a plurality of characters, a selector which selects one of graphics including the above-mentioned characters and causes the display unit to display the thus selected picture, a first memory which stores data about a still picture displayed on the display unit, a second memory which stores data about a moving picture displayed on the display unit, a picture synthesizer which synthesizes a still picture stored in the first memory and a moving picture stored in the second memory with each other in accordance with the graphics having been selected by the selector, and a third memory which stores data about the thus synthesized picture.

Japanese Unexamined Patent Publication No. 11-505644, which is an international patent application PCT/US96/02830 based on the U.S. patent application Ser. No. 08/413,983 filed on Mar. 6, 1995, has suggested a picture producing apparatus including a central processing unit, a system memory storing therein commands used for operating the central processing unit, a frame buffer therein storing a picks map having data about displayable pixels, a rendering processor which is operatively connected to the frame buffer, scan-converts a primitive into pixel data in response to a command transmitted from the central processing unit, and stores the thus obtained pixel data in the frame buffer, a memory bus through which the central processing unit transmits data to or receives data from the system memory, at least one high capacity memory or at least one peripheral device, and an I/O bus through which the central processing unit and the rendering processor transmit data to each other. The central processing unit operates in accordance with commands fetched from the system memory through the memory bus, to thereby produce primitive and texel commands, and transmits the primitive and texel commands to the rendering processor through the I/O bus. The rendering processor produces a pixel memory address, sophisticates the pixel data by linear interpolation, and carries out the texel command.

However, the above-mentioned problem remains unsolved even in the above-mentioned Patent or Publication.

SUMMARY OF THE INVENTION

In view of the above-mentioned problem in the conventional apparatus and method, it is an object of the present invention to provide an apparatus for and a method of carrying out α-blending, both of which are capable of reducing a time necessary for reading data indicative of a ratio at which two data are α-blended, out of a frame buffer, and further reducing data about pictures to be displayed.

In one aspect of the present invention, there is provided an apparatus for carrying out translucent-processing to still and moving pictures, including a moving picture processor for carrying out α-blending process to a moving picture to be displayed, and a still picture processor for carrying out α-blending process to a still picture to be displayed.

It is preferable that the still picture processor carries out the α-blending process to a still picture only when the still picture is updated.

There is further provided an apparatus for carrying out translucent-processing to still and moving pictures, including (a) a judgment unit which judges whether a picture to be displayed is a still or moving picture, and transmits a judgment signal accordingly, (b) a memory which stores first data about first and second pictures to be processed, and second data indicative of a ratio at which pixels of the first and second pictures are blended, (c) a still picture processor which, when the judgment signal indicates that a picture to be processed is a still picture, blends color-relating values of the pixels in a portion at which the first and second pictures overlap each other, at the ratio, for producing third data relating to a translucent picture, and stores the thus produced third data in the memory, and (d) a moving picture processor which, when the judgment signal indicates that a picture to be processed is a moving picture, blends color-relating values of the pixels in a portion at which the first and second pictures overlap each other, at the ratio, for producing fourth data relating to a translucent picture.

It is preferable that the still picture processor carries out translucent-processing to the still picture only when the still picture is updated.

There is still further provided an apparatus for carrying out translucent-processing to still and moving pictures, including (a) a central processing unit which judges whether a picture to be displayed is a still or moving picture, and transmits a judgment signal accordingly, (b) a memory which stores first data about first and second pictures to be processed, and second data indicative of a ratio at which pixels of the first and second pictures are blended, (c) a video interface through which video data is input into the apparatus, (d) a digital differential analysis circuit electrically connected between the central processing unit and the memory, (e) a texture mapping circuit electrically connected between the central processing unit and the memory, (f) a bit-block transferring circuit for transferring a bit block between the central processing unit and the memory, (g) a display macro circuit which controls picture-displaying, (h) a still picture processor which, when the judgment signal indicates that a picture to be processed is a still picture, blends color-relating values of the pixels in a portion at which the first and second pictures overlap each other, at the ratio, for producing third data relating to a translucent picture, and stores the thus produced third data in the memory, the still picture processor being equipped in the bit-block transferring circuit, and (i) a moving picture processor which, when the judgment signal indicates that a picture to be processed is a moving picture, blends color-relating values of the pixels in a portion at which the first and second pictures overlap each other, at the ratio, for producing fourth data relating to a translucent picture, the moving picture processor being equipped in the display macro circuit.

There is yet further provided an apparatus for carrying out translucent-processing to still and moving pictures, including (a) a central processing unit which judges whether a picture to be displayed is a still or moving picture, and transmits a judgment signal accordingly, (b) a memory which stores first data about first and second pictures to be processed, and second data indicative of a ratio at which pixels of the first and second pictures are blended, (c) a video interface through which video data is input into the apparatus, (d) a digital differential analysis circuit electrically connected between the central processing unit and the memory, (e) a texture mapping circuit electrically connected between the central processing unit and the memory, (f) a bit-block transferring circuit for transferring a bit block between the central processing unit and the memory, (g) a display macro circuit which controls picture-displaying, (h) a still picture processor which, when the judgment signal indicates that a picture to be processed is a still picture, blends color-relating values of the pixels in a portion at which the first and second pictures overlap each other, at the ratio, for producing third data relating to a translucent picture, and stores the thus produced third data in the memory, the still picture processor being equipped in the texture mapping circuit, and (i) a moving picture processor which, when the judgment signal indicates that a picture to be processed is a moving picture, blends color-relating values of the pixels in a portion at which the first and second pictures overlap each other, at the ratio, for producing fourth data relating to a translucent picture, the moving picture processor being equipped in the display macro circuit.

In another aspect of the present invention, there is provided a method of carrying out translucent-processing to still and moving pictures, including the steps of carrying out α-blending process to a moving picture to be displayed, in accordance with first steps, and carrying out α-blending process to a still picture to be displayed, in accordance with second steps.

It is preferable that the α-blending process is carried out to the still picture only when the still picture is updated.

There is further provided a method of carrying out translucent-processing to still and moving pictures, including the steps of (a) judging whether a picture to be displayed is a still or moving picture, (b) storing first data about first and second pictures to be processed, and second data indicative of a ratio at which pixels of the first and second pictures are blended, into a memory, (c) when the picture to be processed is a still picture, blending color-relating values of the pixels in a portion at which the first and second pictures overlap each other, at the ratio, for producing third data relating to a translucent picture, and storing the thus produced third data in the memory, and (d) when the judgment signal indicates that a picture to be processed is a moving picture, blending color-relating values of the pixels in a portion at which the first and second pictures overlap each other, at the ratio, for producing fourth data relating to a translucent picture.

There is still further provided a method of carrying out translucent-processing to still and moving pictures, including the steps of (a) receiving first data of a still picture, second data of a still picture, third data of a moving picture, fourth data of a moving picture, and a blending ratio α, and storing them into a memory, (b) reading the first and second data and the blending ratio α out of the memory, (c) carrying out α-blending process to both the first and second data, and the third and fourth data independently of each other, and (d) storing the first and second data into the memory.

The method may further include (e) reading the first and second data again out of the memory, (f) transmitting the first and second data for displaying pictures expressed by the first and second data, and (g) repeating the steps (e) and (f) until the still picture is updated.

The advantages obtained by the aforementioned present invention will be described hereinbelow.

In accordance with the present invention, an α-blending process is switched between a still picture and a moving picture. Specifically, an α-blending process is carried out to a still picture in the still picture processor, and another α-blending process is carried out to a moving picture in the moving picture processor.

By carrying out the α-blending process to a still picture only when a still picture is updated, it would be possible to reduce the number of access to a frame buffer memory in comparison with the conventional apparatus in which the α-blending process is carried out to each of frames.

By designing the still picture processor to carry out translucent-processing in a period of time equal to a time necessary for transferring rectangular picture data, it would be possible for the bit-block transferring circuit to include the still picture processor therein without necessity of modifying the circuit structure of the still picture processor.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 3:
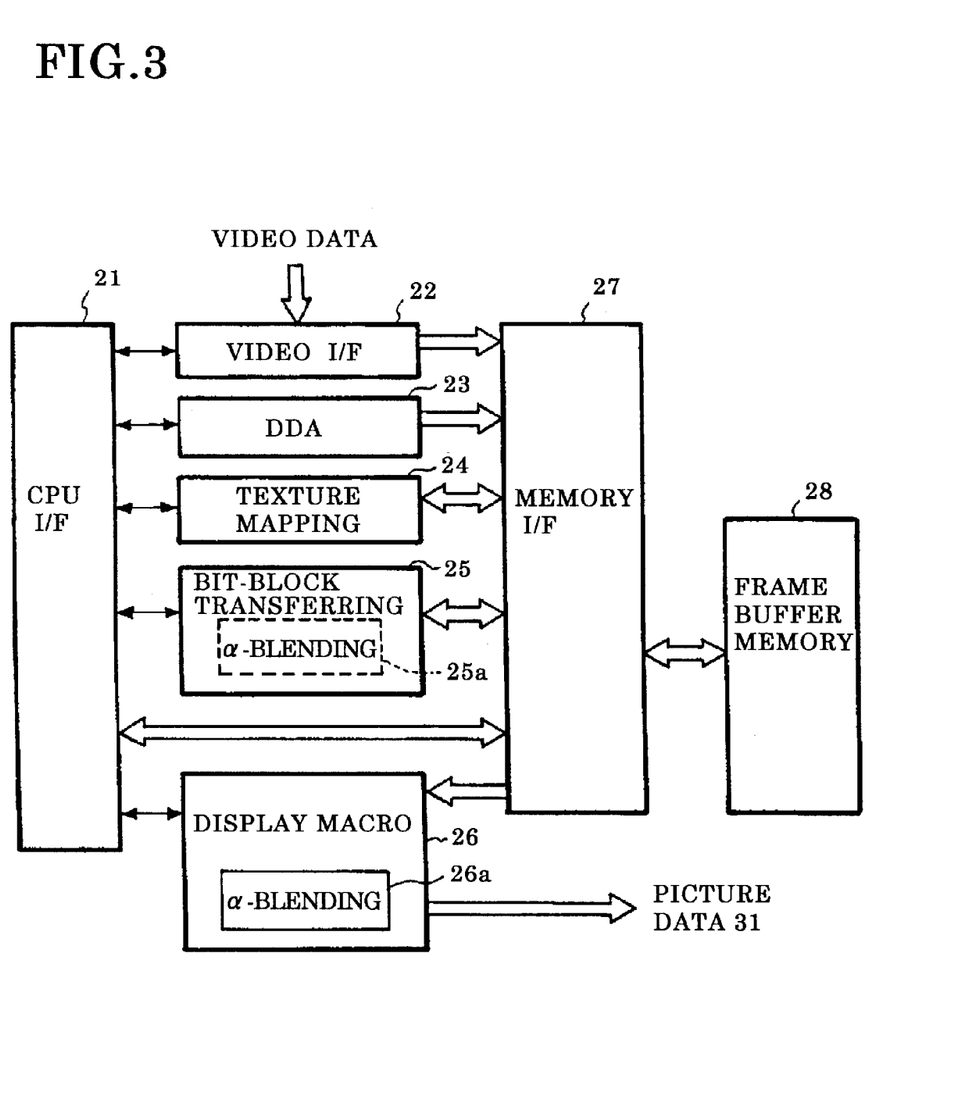
FIG. 3 is a block diagram of an apparatus for carrying out α-blending process, in accordance with the first embodiment.

FIG. 3 is a block diagram of an apparatus for carrying out α-blending process to a picture, in accordance with the first embodiment.

The apparatus is comprised of a central processing unit interface 21 to which picture data and first data indicative of a ratio at which two data is α-blended are input, a video interface 22 to which video data is input, a frame buffer memory 28 storing the above-mentioned picture data and first data therein, a memory interface 27 acting as an interface for the frame buffer memory 28, a graphic macro circuit, and a display macro circuit 26 which controls pictures to be displayed.

The graphic macro circuit is comprised of a digital differential analysis (DDA) circuit 23, a texture mapping circuit 24 which applies a picture or a pattern to a surface of a modeled object, and a circuit 25 for transferring a bit block.

The bit-block transferring circuit 25 includes a first apparatus 25a for carrying out α-blending to a still picture. The display macro circuit 26 includes a second apparatus 26a for carrying out α-blending process to a moving picture.

The first apparatus 25a included in the bit-block transferring circuit 25 and the second apparatus 26a included in the display macro circuit 26 are alternatively used in dependence on whether a picture to be displayed is a still picture or a moving picture. If a picture to be displayed is a moving picture, the second apparatus 26a is used, whereas if a picture to be displayed is a still picture, the first apparatus 25a is used. A central processing unit (not illustrated) transmits a signal through the central processing unit interface 21, and one of the first and second apparatuses 25a and 26a is selected in accordance with the signal.

Figure 4:
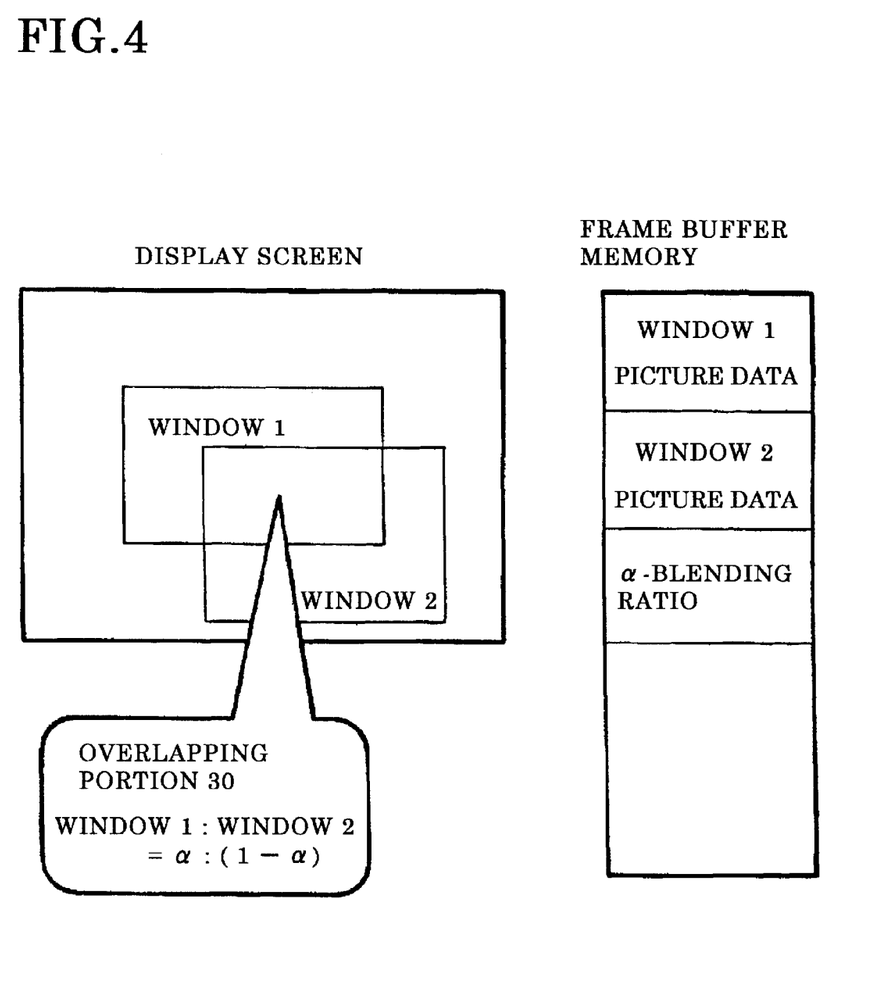
FIG. 4 illustrates a concept of the α-blending process.

FIG. 4 shows the α-blending process. With reference to FIG. 4, first data about a first picture "Window 1", second data about a second picture "Window 2" and a α-blending ratio are stored in the frame buffer memory 28. In the α-blending process, color-relating values of pixels in an overlapping portion 30 at which the first and second pictures overlap each other are blended at a ratio of α: (1−α) to thereby produce a translucent picture.

The first apparatus 25a carries out the α-blending process only when a still picture is updated, and stores data about the thus α-blended picture in the frame buffer memory 28. The display macro circuit 26 reads the data about the α-blended picture out of the frame buffer memory 28 for each of frames, and outputs the data 31 as data about a picture to be displayed.

The second apparatus 26a equipped in the display macro circuit 26 carries out the α-blending process to a moving picture for respective frames. Data of a moving picture α-blended by the second apparatus 26a is output as it is as data of a picture to be displayed.

The reason of carrying out the α-blending process to a moving picture for respective frames is as follows. When two data to be α-blended are both data of a moving picture, those moving pictures are updated for respective frames. Hence, if two data are not α-blended for any one frame, one of two moving pictures expressed by the two data is not displayed at all, or a displayed moving picture is kept stopped. Accordingly, two data for a moving picture have to be α-blended for respective frames.

The first apparatus 25a can be equipped into the bit-block transferring circuit 25 without necessity of modifying a circuit structure except a circuit for carrying out the α-blending process, by equalizing a time necessary for carrying out the α-blending process to a time necessary for carrying out raster operation (ROP) function.

Hereinbelow is explained ROP function. The bit-block transferring circuit 5 carries out logic operation about source picture data, pattern picture data and destination picture data for transferring a picture data having a rectangular area. A command for carrying out such logic operation is called ROP function.

In FIG. 3, the central processing unit 21, the video interface 22, the memory interface 27, the display macro circuit 26, and the graphic macro circuit including the digital differential analysis circuit 23, the texture mapping circuit 24 and the bit-block transferring circuit 25 are well-known to those skilled in the art, and are not directly related to the concept of the present invention. Accordingly, they are not explained in detail.

Hereinbelow are explained the α-blending process to be carried out to a moving picture and a still picture.

First, the α-blending process to be carried out to a moving picture is explained hereinbelow.

Figure 5:
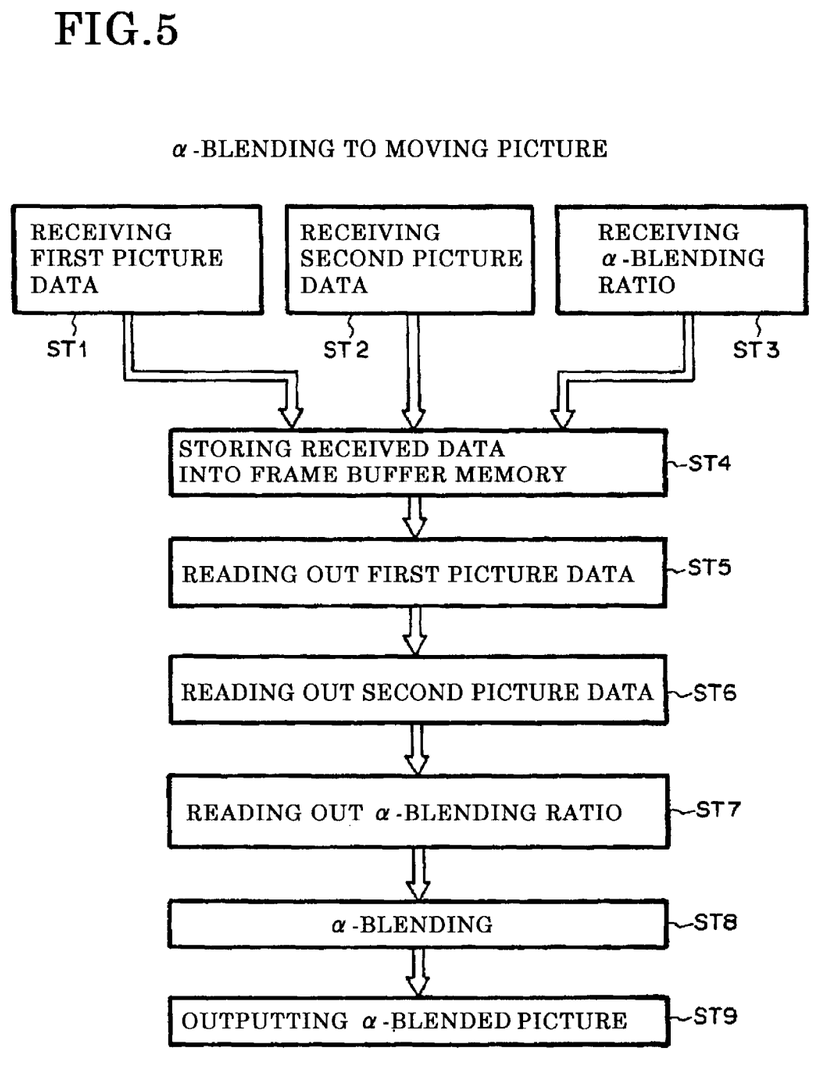
FIG. 5 is a flow chart of a method of carrying out α-blending process to a moving picture.

The α-blending process is carried out by the second apparatus 26a to a moving picture. FIG. 5 is a flow chart showing steps to be carried out in the α-blending process. The α-blending process is carried out for each of frames.

With reference to FIG. 5, two data of a moving picture, to be α-blended, are input into the second apparatus 26a from the central processing unit interface 21 and the video interface 22, in steps ST1 and ST2. The second apparatus 26a stores the received data into the frame buffer memory 28 through the memory interface 27, in step ST4.

The second apparatus 26a also receives an α-blending ratio from the central processing unit interface 21, in step ST3. An α-blending ratio is defined as a ratio at which two data of a moving picture is blended. The second apparatus 26a stores the received α-blending ratio into the frame buffer memory 28, in step ST4.

The two data and the α-blending ratio both having been stored into the frame buffer memory 28 are read out of the frame buffer memory 28 by the display macro circuit 26, in steps ST5, ST6 and ST7.

The thus read-out two data are α-blended at the α-blending ratio by the second apparatus 26a, in step ST8. The resultant α-blended picture is output from the display macro circuit 26 as a picture to be displayed, in step ST9.

Secondly, the α-blending process to be carried out to a still picture is explained hereinbelow.

Figure 6:
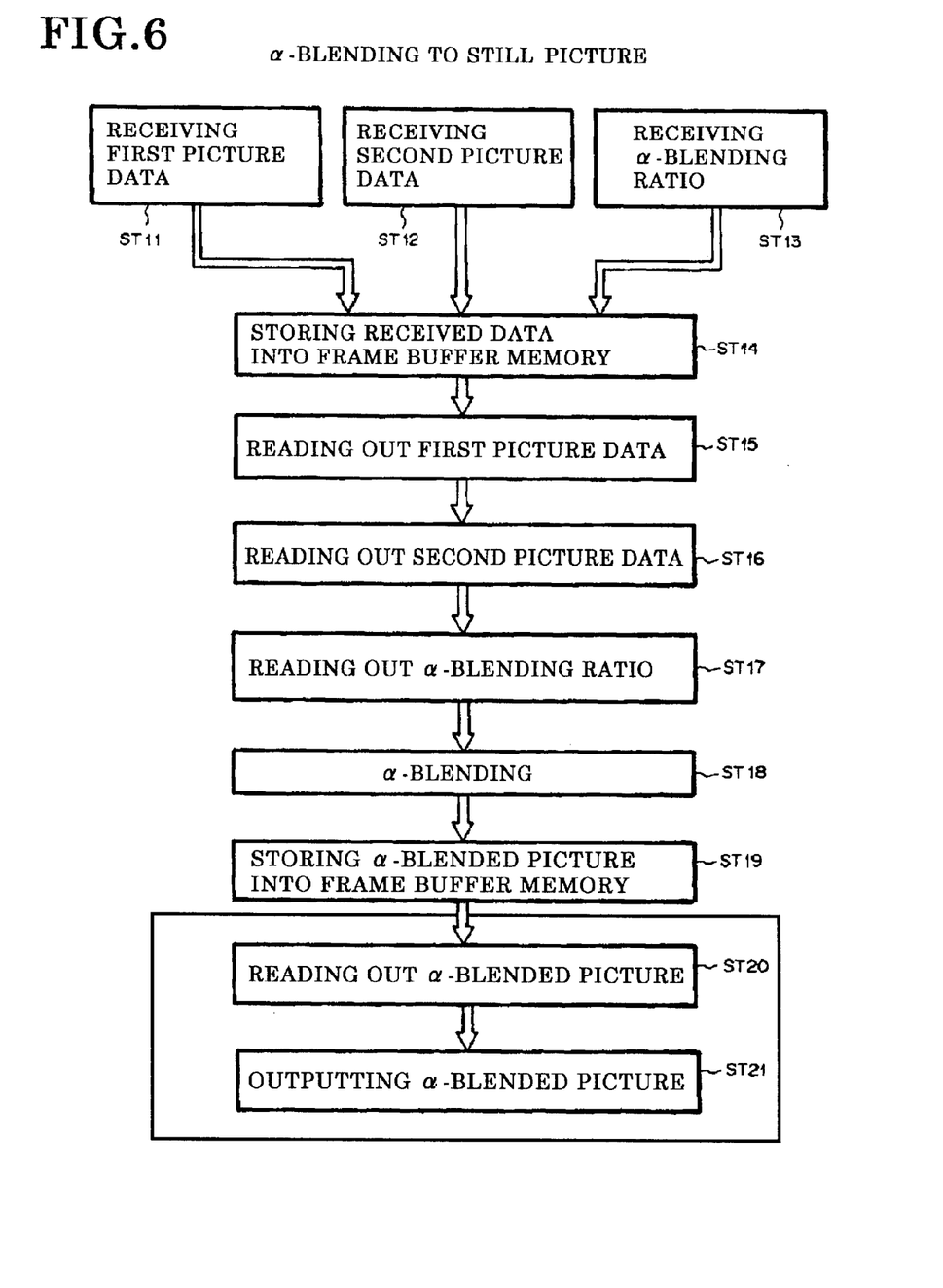
FIG. 6 is a flow chart of a method of carrying out α-blending process to a still picture.

The α-blending process is carried out by the first apparatus 25a to a still picture. FIG. 6 is a flow chart showing steps to be carried out in the α-blending process. The α-blending process is carried out only when a still picture is updated.

With reference to FIG. 6, two data of a still picture, to be α-blended, are input into the first apparatus 25a from the central processing unit interface 21 or the video interface 22, in steps ST11 and ST12. The first apparatus 25a stores the received data into the frame buffer memory 28 through the memory interface 27, in step ST14.

The first apparatus 25a also receives the α-blending ratio from the central processing unit interface 21, in step ST13. The first apparatus 25a stores the received α-blending ratio into the frame buffer memory 28, in step ST14.

The two data and the α-blending ratio both having been stored into the frame buffer memory 28 are read out of the frame buffer memory 28 by the bit-block transferring circuit 25, in steps ST15, ST16 and ST17.

The thus read-out two data are α-blended at the α-blending ratio by the first apparatus 25a, in step ST18. The first apparatus 25a stores the resultant α-blended picture into the frame buffer memory 28, in step ST19.

The display macro circuit 26 reads the resultant α-blended picture out of the frame buffer memory 28a, in step ST20, and outputs the α-blended picture as a RGB picture to be displayed, in step ST21.

If a still picture is not updated, the display macro circuit 26 reads the α-blended picture out of the frame buffer memory 28 in step ST20, and outputs the thus read-out α-blended picture as a RGB picture to be displayed, in step ST 21. Until a still picture is updated, the display macro circuit 26 repeatedly carries out the steps ST20 and ST21.

A central processing unit (not illustrated) operates the first or second apparatus 25a or 26a for carrying out the α-blending process to a still or moving picture, in dependence on a picture to be displayed is a still or moving picture. The α-blending process to be carried out to a still picture, illustrated in FIG. 6 makes access to the frame buffer memory 28 by the greater number than the number of making access to the buffer memory 28 in the α-blending process to be carried out to a moving picture, illustrated in FIG. 5. However, this does cause any problem, if the α-blending process is carried out to a still picture until a still picture is updated. The α-blending process is actually carried out in a period of time during which data of a picture to be displayed is relatively small in volume, in order to prevent excessive access to the frame buffer memory 28 made for displaying a picture. For instance, the α-blending process is carried out during a blank period during which a picture is not displayed, or during a period in which background data is displayed.

As mentioned above, when a picture to be displayed is a moving picture, the display macro circuit 26 reads both two data of a moving picture, to be α-blended, and the α-blending ratio out of the frame buffer memory 28, and then, the second apparatus 26a α-blends the thus read-out two data at the α-blending ratio. Then, the display macro circuit 26 outputs the resultant α-blended picture as a RGB picture data to be displayed.

When a picture to be displayed is a still picture, the α-blending process is carried out only when a still picture is updated. The bit-block transferring circuit 25 reads both two data of a still picture, to be α-blended, and the α-blending ratio out of the frame buffer memory 28, and then, the first apparatus 25a α-blends the thus read-out two data at the α-blending ratio. Then, the bit-block transferring circuit 25 stores the resultant α-blended picture into the frame buffer memory 28. The display macro circuit 26 reads the resultant α-blended picture out of the frame buffer memory 28, and outputs the resultant α-blended picture as a RGB picture data to be displayed.

As mentioned above, the α-blending process is carried out to a still picture only when a still picture is updated. Accordingly, the apparatus in accordance with the first embodiment would make it possible to save a time necessary for reading the α-blending ratio out of the frame buffer memory 28, and hence, would further make it possible to avoid reduction in size in data of a picture to be displayed which reduction is caused by a limit in time for making access to the frame buffer memory 28, in comparison with the conventional apparatus in which the α-blending process has to be carried out for each of frames.

The apparatus in accordance with the first embodiment would make it possible to display picture data in volume three times greater than the conventional apparatus, if the following conditions (A) to (E) are satisfied.

(A) A still picture is displayed after having been α-blended.

(B) An α-blending ratio is stored in a frame buffer memory for each of pixel data.

(C) An α-blending ratio is expressed in 8 bits. If an α-blending ratio is expressed in 9 bits or greater, a picture could be displayed more effectively.

(D) Data of a picture, to be α-blended, has 8 bpp (bits per pixel).

(E) Two data of a picture, to be α-blended, entirely overlap each other on a display screen.

The reason for being able to display picture data in three-times volume is as follows.

In the conventional α-blending process, it was necessary to read two picture data and an α-blending ratio out of a frame buffer memory, in which case, the α-blending ratio corresponds to a picture data with respect to data volume. If the above-mentioned conditions (A) to (E) are satisfied, what has to do in the apparatus in accordance with the first embodiment is to read picture data covering a single picture, out of the frame buffer memory 28. Accordingly, the apparatus in accordance with the first embodiment can reduce a time necessary for making access to the frame buffer memory 28, down to one-third in comparison with the conventional apparatus.

The capability of displaying data in three-times larger volume presents the following advantages.

First, when a picture is displayed, the display macro circuit 26 might make access to the frame buffer memory 28 at a one-third rate in comparison with a case where the conventional apparatus displays the same picture. As a result, the apparatus in accordance with the first embodiment could use a low-speed and hence cheap memory as the frame buffer memory 28.

Secondly, the apparatus in accordance with the first embodiment could display a picture in about three-times volume in comparison with the conventional apparatus, if the apparatus uses the memory which is also used in the conventional apparatus. Hence, it would be possible to increase the number of synthesized pictures and a size of a display screen.

Even if the α-blending process is carried out to moving and still pictures independently of each other, the α-blending process can be carried out to a moving picture at the same rate as that of the conventional apparatus. Though the α-blending process to be carried out to a still picture has to make access to the frame buffer memory 28 in the greater number than the α-blending process to be carried out to a moving picture, this does not cause any problem. For instance, if a still picture has a length of 1 second, and 30 frames have to be displayed in 1 second for displaying the still picture on a display screen, the α-blending process might be carried out only to the first frame among the 30 frames. In comparison with the conventional apparatus which has to carry out the α-blending process for respective frames, the number of making access to the frame buffer memory 28 is reduced down to about one-third in the apparatus in accordance with the first embodiment, as follows.

It is assumed that data of one picture has a unit volume. If the above-mentioned conditions (A) to (E) are satisfied, the first frame would have five unit volumes: two data of pictures to be α-blended; an α-blending ratio; storing the α-blended data into the frame buffer memory 28; and reading the α-blended data out of the frame buffer memory 28. The second or later frame would have just a unit volume, that is, reading the α-blended data out of the frame buffer memory 28.

Accordingly, the number of accesses to the frame buffer memory 28 in the α-blending process to be carried out to a still picture is calculated as follows.

5×1+1×(30−1)=34

In contrast, the number of accesses to the frame buffer memory 28 in the α-blending process to be carried out to a moving picture is as follows.

30×3=90

Accordingly, a ratio of the number of accesses to the frame buffer memory 28 in the α-blending process to be carried out to a still picture to the number of accesses to the frame buffer memory 28 in the α-blending process to be carried out to a moving picture is calculated as follows.

(34/90)×100=37.8%

[Second Embodiment]

Figure 7:
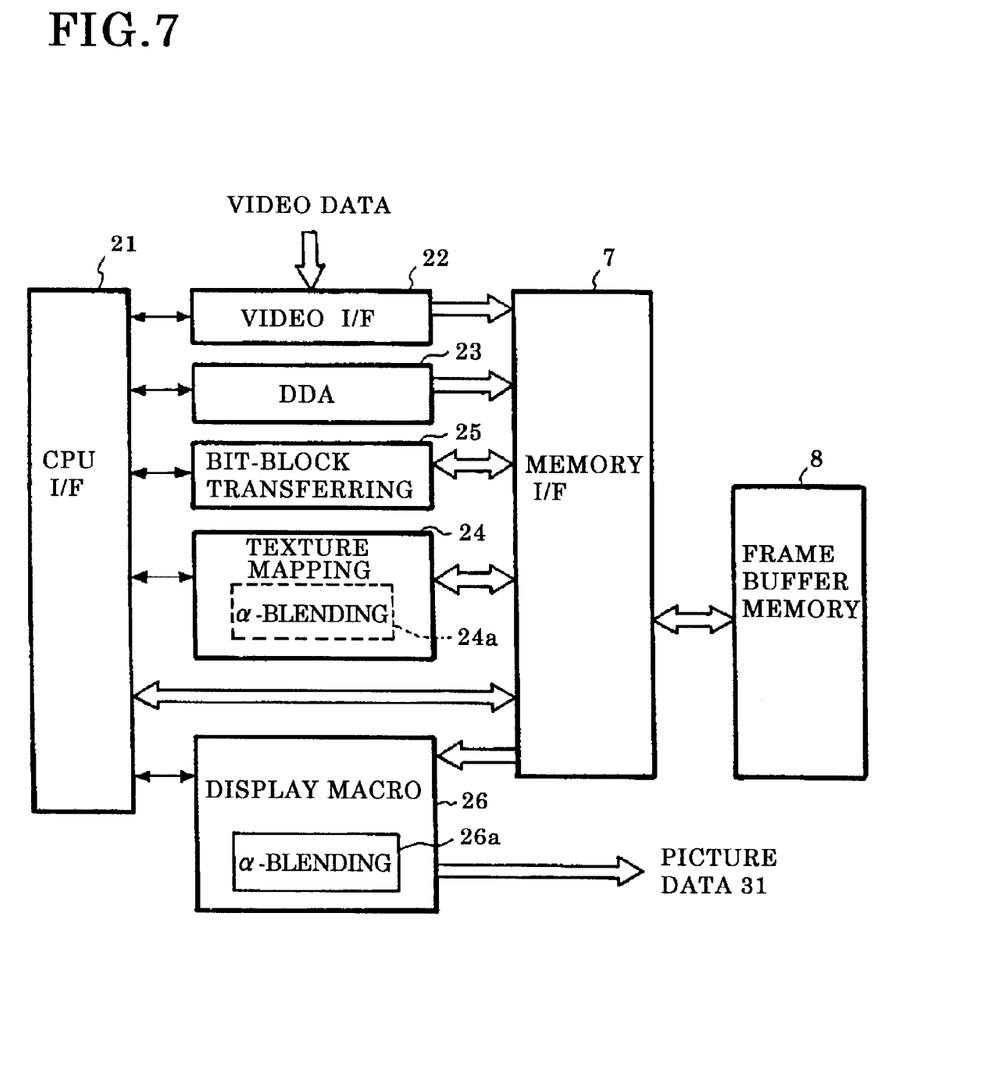
FIG. 7 is a block diagram of an apparatus for carrying out α-blending process, in accordance with the second embodiment.

FIG. 7 is a block diagram of an apparatus for carrying out α-blending process to a picture, in accordance with the second embodiment.

The apparatus in accordance with the second embodiment is structurally different from the apparatus in accordance with the first embodiment in that an apparatus 24a for carrying out the α-blending process to a still picture is equipped in the texture mapping circuit 24 in place of the bit-block mapping circuit 25.

In the apparatus in accordance with the second embodiment, the apparatus 24a equipped in the texture mapping circuit 24 carries out the α-blending process to a still picture. Though the apparatus 24a has to read two source pictures for carrying out the α-blending process to a still picture, the apparatus 24a can carry out the α-blending process to a picture other than rectangular pictures.

In dependence on whether a picture to be displayed is rectangular or not, any one, two or all of the apparatuses 24a, 25a and 26a may be used as follows.

When a non-rectangular still picture, a rectangular still, and a moving picture are to be α-blended, the apparatuses 24a, 25a and 26a are all used for carrying out the α-blending process to those pictures. A rectangular still picture is α-blended by the apparatus 25a, a non-rectangular still picture is α-blended by the apparatus 24a, and a moving picture is α-blended by the apparatus 26a. By using all of the apparatuses 24a, 25a and 26a, accesses to the frame buffer memory 28 can be reduced in number.

When a rectangular moving picture and a still picture are to be α-blended, the apparatuses 25a and 26a are all used for carrying out the α-blending process to those pictures. A rectangular still picture is α-blended by the apparatus 25a, a non-rectangular still picture is α-blended by the apparatus 26a, and a moving picture is α-blended also by the apparatus 26a.

When a moving picture and a still picture are to be α-blended, the apparatuses 24a and 26a are all used for carrying out the α-blending process to those pictures. A still picture is α-blended by the apparatus 24a, and a moving picture is α-blended also by the apparatus 26a.

When a rectangular still picture and a moving picture are to be α-blended, where the still picture is greater in volume than the moving picture, only the apparatus 25a is used for carrying out the α-blending process to those pictures.

When a still picture is to be α-blended, the apparatuses 24a and 25a are all used for carrying out the α-blending process to the picture. A rectangular still picture is α-blended by the apparatus 25a, and a non-rectangular still picture is α-blended by the apparatus 24a.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-370604 filed on Dec. 5, 2000 including specification, claims, drawings and summary is incorporated herein by reference in its entirety.

What is claimed is:

1. An apparatus for carrying out translucent-processing to still and moving pictures, including a moving picture processor for carrying out α-blending process to a moving picture to be displayed, and a still picture processor for carrying out α-blending process to a still picture to be displayed.

2. The apparatus as set forth in claim 1, wherein said still picture processor carries out said α-blending process to a still picture only when said still picture is updated.

3. An apparatus for carrying out translucent-processing to still and moving pictures, comprising:
   (a) a judgment unit which judges whether a picture to be displayed is a still or moving picture, and transmits a judgment signal accordingly;
   (b) a memory which stores first data about first and second pictures to be processed, and second data indicative of a ratio at which pixels of said first and second pictures are blended;
   (c) a still picture processor which, when said judgment signal indicates that a picture to be processed is a still picture, blends color-relating values of said pixels in a portion at which said first and second pictures overlap each other, at said ratio, for producing third data relating to a translucent picture, and stores the thus produced third data in said memory; and
   (d) a moving picture processor which, when said judgment signal indicates that a picture to be processed is a moving picture, blends color-relating values of said pixels in a portion at which said first and second pictures overlap each other, at said ratio, for producing fourth data relating to a translucent picture.

4. The apparatus as set forth in claim 3, wherein said still picture processor carries out translucent-processing to said still picture only when said still picture is updated.

5. An apparatus for carrying out translucent-processing to still and moving pictures, comprising:
   (a) a central processing unit which judges whether a picture to be displayed is a still or moving picture, and transmits a judgment signal accordingly;
   (b) a memory which stores first data about first and second pictures to be processed, and second data indicative of a ratio at which pixels of said first and second pictures are blended;
   (c) a video interface through which video data is input into said apparatus;
   (d) a digital differential analysis circuit electrically connected between said central processing unit and said memory;
   (e) a texture mapping circuit electrically connected between said central processing unit and said memory;
   (f) a bit-block transferring circuit for transferring a bit block between said central processing unit and said memory;
   (g) a display macro circuit which controls picture-displaying;
   (h) a still picture processor which, when said judgment signal indicates that a picture to be processed is a still picture, blends color-relating values of said pixels in a portion at which said first and second pictures overlap each other, at said ratio, for producing third data relating to a translucent picture, and stores the thus produced third data in said memory, said still picture processor being equipped in said bit-block transferring circuit; and
   (i) a moving picture processor which, when said judgment signal indicates that a picture to be processed is a moving picture, blends color-relating values of said pixels in a portion at which said first and second pictures overlap each other, at said ratio, for producing fourth data relating to a translucent picture, said moving picture processor being equipped in said display macro circuit.

6. The apparatus as set forth in claim 5, wherein said still picture processor carries out translucent-processing in a period of time equal to a time necessary for transferring rectangular picture data.

7. The apparatus as set forth in claim 5, wherein said still picture processor carries out translucent-processing to said still picture only when said still picture is updated.

8. An apparatus for carrying out translucent-processing to still and moving pictures, comprising:
   (a) a central processing unit which judges whether a picture to be displayed is a still or moving picture, and transmits a judgment signal accordingly;
   (b) a memory which stores first data about first and second pictures to be processed, and second data indicative of a ratio at which pixels of said first and second pictures are blended;
   (c) a video interface through which video data is input into said apparatus;
   (d) a digital differential analysis circuit electrically connected between said central processing unit and said memory;
   (e) a texture mapping circuit electrically connected between said central processing unit and said memory;
   (f) a bit-block transferring circuit for transferring a bit block between said central processing unit and said memory;
   (g) a display macro circuit which controls picture-displaying;
   (h) a still picture processor which, when said judgment signal indicates that a picture to be processed is a still picture, blends color-relating values of said pixels in a portion at which said first and second pictures overlap each other, at said ratio, for producing third data relating to a translucent picture, and stores the thus produced third data in said memory, said still picture processor being equipped in said texture mapping circuit; and
   (i) a moving picture processor which, when said judgment signal indicates that a picture to be processed is a moving picture, blends color-relating values of said pixels in a portion at which said first and second pictures overlap each other, at said ratio, for producing fourth data relating to a translucent picture, said moving picture processor being equipped in said display macro circuit.

9. The apparatus as set forth in claim 8, wherein said still picture processor carries out translucent-processing to said still picture only when said still picture is updated.

10. A method of carrying out translucent-processing to still and moving pictures, comprising the steps of:
    carrying out α-blending process to a moving picture to be displayed, in accordance with first steps; and
    carrying out α-blending process to a still picture to be displayed, in accordance with second steps.

11. The method as set forth in claim 10, wherein said α-blending process is carried out to said still picture only when said still picture is updated.

12. A method of carrying out translucent-processing to still and moving pictures, comprising the steps of:

(a) judging whether a picture to be displayed is a still or moving picture;

(b) storing first data about first and second pictures to be processed, and second data indicative of a ratio at which pixels of said first and second pictures are blended, into a memory;

(c) when said picture to be processed is a still picture, blending color-relating values of said pixels in a portion at which said first and second pictures overlap each other, at said ratio, for producing third data relating to a translucent picture, and storing the thus produced third data in said memory; and (d) when said judgment signal indicates that a picture to be processed is a moving picture, blending color-relating values of said pixels in a portion at which said first and second pictures overlap each other, at said ratio, for producing fourth data relating to a translucent picture.

13. The method as set forth in claim 12, wherein said step (c) is carried out only when said still picture is updated.

14. A method of carrying out translucent-processing to still and moving pictures, comprising the steps of:

(a) receiving first data of a still picture, second data of a still picture, third data of a moving picture, fourth data of a moving picture, and $\alpha$-blending ratio $\alpha$, and storing them into a memory;

(b) reading said first and second data and said blending ratio $\alpha$ out of said memory;

(c) carrying out $\alpha$-blending process to both said first and second data, and said third and fourth data independently of each other; and (d) storing said first and second data into said memory.

15. The method as set forth in claim 14, further comprising:

(e) reading said first and second data again out of said memory;

(f) transmitting said first and second data for displaying pictures expressed by said first and second data; and (g) repeating said steps (e) and (f) until said still picture is updated.

* * * * *